US012791121B2

(12) United States Patent
Kim et al.

(10) Patent No.: US 12,791,121 B2
(45) Date of Patent: Nov. 10, 2026

(54) FLUID DISCHARGE VALVE

(71) Applicants: Hyundai Motor Company, Seoul (KR); Kia Corporation, Seoul (KR)

(72) Inventors: Gyu Young Kim, Yongin-si (KR); In Tae Park, Yongin-si (KR); Hak Yoon Kim, Bupyeong-gu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 930 days.

(21) Appl. No.: 17/869,303

(22) Filed: Jul. 20, 2022

(65) Prior Publication Data

US 2023/0296190 A1 Sep. 21, 2023

(30) Foreign Application Priority Data

Mar. 17, 2022 (KR) .......................... 1020220033612

(51) Int. Cl.

| | |
|---|---|
| ***F16K 49/00*** | (2006.01) |
| ***F16K 31/06*** | (2006.01) |
| ***H01M 8/04082*** | (2016.01) |
| ***H01M 8/04119*** | (2016.01) |

(52) U.S. Cl.

CPC ........ *F16K 49/002* (2013.01); *F16K 31/0655* (2013.01); *H01M 8/04156* (2013.01); *H01M 8/04201* (2013.01)

(58) Field of Classification Search

None

See application file for complete search history.

(56) References Cited

U.S. PATENT DOCUMENTS

| | | | |
|---|---|---|---|
| 11,127,959 B2 | 9/2021 | Yoshitomi et al. | |
| 11,171,346 B2 | 11/2021 | Okamura et al. | |
| 2012/0111848 A1* | 5/2012 | Kim .................. | B01D 53/0438 219/385 |
| 2019/0131506 A1* | 5/2019 | Kim ....................... | H10N 10/01 |
| 2019/0252701 A1 | 8/2019 | Okamura et al. | |

FOREIGN PATENT DOCUMENTS

| | | |
|---|---|---|
| JP | H06101777 | 4/1994 |
| JP | 2021051875 | 4/2021 |
| JP | 2019139935 | 5/2022 |
| KR | 101047299 | 7/2011 |
| KR | 10-2012-0048969 A | 5/2012 |

(Continued)

OTHER PUBLICATIONS

Translation of KR-101628096-B1 (Year: 2016).*
Translation of KR-102317903-B1 (Year: 2021).*

*Primary Examiner* — Elizabeth M Kerr
(74) *Attorney, Agent, or Firm* — Fish & Richardson P.C.

(57) ABSTRACT

A fluid discharge valve includes a housing that defines a flow path configured to guide fluid, a partition that faces the flow path and is configured to move relative to the flow path, and a heater that is coupled and fixed to the housing and configured to supply heat to the flow path. The flow path includes a first flow path that is in fluid communication with an outside of the housing and extends along a first direction toward the partition, and a second flow path that extends from the first flow path along a second direction that crosses the first direction. The heater has a first side that faces the first flow path and a second side that face the second flow path.

18 Claims, 5 Drawing Sheets

10

(56) References Cited

FOREIGN PATENT DOCUMENTS

| | | | | | |
|---|---|---|---|---|---|
| KR | 20150097921 | | | 8/2015 | |
| KR | 101628096 | | | 6/2016 | |
| KR | 101628096 | B1 | * | 6/2016 | ........ H01M 8/04156 |
| KR | 10-2019-0046550 | A | | 5/2019 | |
| KR | 102092180 | | | 3/2020 | |
| KR | 102299531 | | | 9/2021 | |
| KR | 102317903 | | | 10/2021 | |
| KR | 102317903 | B1 | * | 10/2021 | ........ H01M 8/04253 |

* cited by examiner

FLUID DISCHARGE VALVE

CROSS-REFERENCE TO RELATED APPLICATION(S)

This application claims priority from and the benefit of Korean Patent Application No. 10-2022-0033612, filed on Mar. 17, 2022, the disclosure of which is hereby incorporated by reference for all purposes as if set forth herein.

TECHNICAL FIELD

The present disclosure relates to a fluid discharge valve and, more particularly, to a fluid discharge valve for a fuel cell system.

BACKGROUND

Solenoid valves may control opening and closing of flow paths by plungers that move when receiving a magnetic force from a magnetic field generated as electric current flows through coils. For example, a solenoid valve may control supply of hydrogen to a fuel cell or discharge of a fluid from the fuel cell.

In some cases, where the solenoid valve is used to control the supply of hydrogen, the solenoid valve may be exposed to low temperatures due to the hydrogen that flows in a low temperature state. Accordingly, freezing issues may occur in the solenoid valve. For instance, the freezing issues may frequently occur inside a flow path of the hydrogen or in a diaphragm which is exposed to the flow path and opens and closes the flow path according to the movement of a plunger.

In some cases, where the solenoid valve is employed in a fuel cell system, the operation performance of the solenoid valve may be deteriorated due to the occurrence of freezing issues.

SUMMARY

The present disclosure describes a fluid discharge valve that can minimize the occurrence of freezing issues even when a solenoid valve is exposed to low temperatures, thereby securing operation performance of the solenoid valve even in a low temperature state.

According to one aspect of the subject matter described in this application, a fluid discharge valve includes a housing that defines a flow path configured to guide fluid, a partition that faces the flow path and is configured to move relative to the flow path, and a heater coupled and fixed to the housing, the heater being configured to supply heat to the flow path. The flow path includes a first flow path that is in fluid communication with an outside of the housing and extends along a first direction toward the partition, and a second flow path that extends from the first flow path along a second direction different from the first direction. The heater has a first side that faces the first flow path and a second side that faces the second flow path.

Implementations according to this aspect can include one or more of the following features. For example, the heater can face an intersection of the first flow path and the second flow path. In some examples, the partition can be configured to move in a direction parallel to the first direction. In some examples, the housing can have an inner surface that defines the first flow path, where the heater surrounds an entire circumference of the inner surface of the housing.

In some implementations, the fluid discharge valve can further include an electrode that is inserted into the housing and contacts the heater. In some examples, the electrode can include a first electrode that faces the first flow path, where the heater is disposed between the electrode and the first flow path. In some examples, the electrode can further include a second electrode that surrounds the second flow path. In some examples, the first electrode and the second electrode are directly connected to each other. In some implementations, the housing can have an inner surface that defines the second flow path, where the second electrode surrounds an entire circumference of the inner surface of the housing.

In some implementations, the first direction can be parallel to a horizontal direction, and the second direction can be parallel to a vertical direction orthogonal to the horizontal direction.

In some implementations, the fluid discharge valve can further include a fixing member that couples and fixes the electrode to the housing. For example, the fixing member can include a plurality of wedges that are inclined with respect to the first direction or the second direction, where each of the plurality of wedges has an end coupled to the electrode.

In some examples, the fixing member can include a flat spring that has one side fixed to the electrode. In some examples, the fixing member can include a protrusion that has a first end coupled to the electrode and a second end coupled to the housing, where the protrusion extends from the first end to the second end in a direction perpendicular to an extension direction of the electrode.

In some implementations, the housing and the heater can have circular ring shapes, where the heater is disposed inside the housing and surrounds the first flow path. In some examples, the fluid discharge valve can further include an electrode that is inserted between the housing and the heater and surrounds the heater, where the electrode has a circular ring shape. In some examples, the electrode can be in contact with an outer circumferential surface of the heater and an inner circumferential surface of the housing.

In some implementations, the housing and the heater can have quadrangular ring shapes, where the heater is disposed inside the housing and surrounds the first flow path. In some examples, the fluid discharge valve can further include an electrode that is inserted between the housing and the heater and surrounds the heater, where the electrode has a quadrangular ring shape. For instance, the housing can have a plurality of housing surfaces that face and surround the electrode, and the electrode can have a plurality of electrode surfaces that face the plurality of housing surfaces and surround the heater. The heater can have a plurality of heater surfaces that face the plurality of electrode surfaces and surround the first flow path.

DETAILED DESCRIPTION

Hereinafter, one or more implementations of a fluid discharge valve will be described with reference to the drawings.

Figure 1:
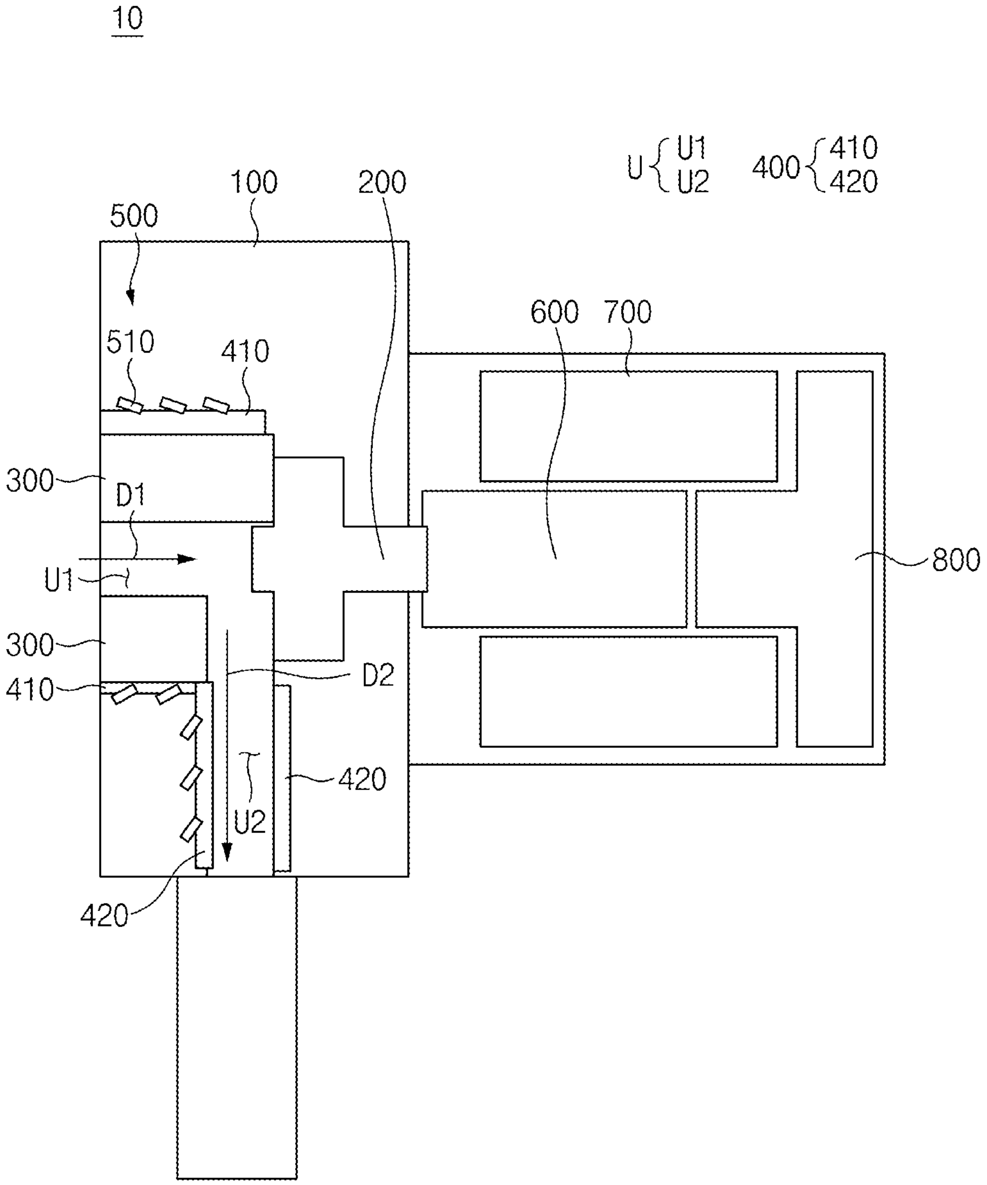
FIG. 1 is a cross-sectional view illustrating an example of a fluid discharge valve.
Figure 2:
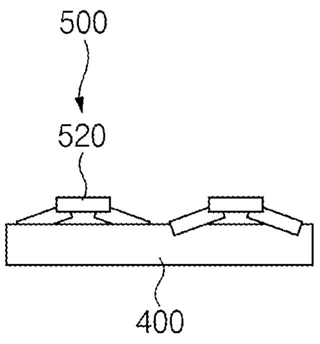
FIG. 2 is a view illustrating an example of a flat spring as a fixing member coupled to an example of an electrode member.
Figure 3:
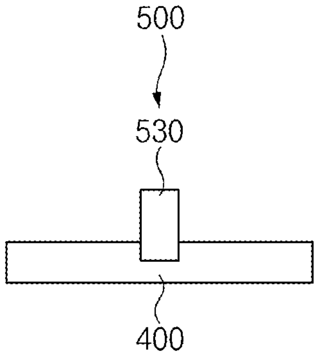
FIG. 3 is a view illustrating an example of a protrusion as a fixing member coupled to an example of an electrode member.

FIG. 1 is a cross-sectional view illustrating an example of a fluid discharge valve, FIG. 2 is a view illustrating an example of a flat spring as a fixing member coupled to an example of an electrode member, and FIG. 3 is a view illustrating an example of a protrusion as a fixing member coupled to an electrode member.

In some implementations, the fluid discharge valve can include a solenoid valve. In some examples, the fluid discharge valve can be configured to supply a fuel (e.g., hydrogen) to a fuel cell or discharge a fluid (e.g., water) from the fuel cell.

In some implementations, a fluid discharge valve 10 can include a housing 100 having therein a flow path U through which a fluid flows, and a partition member 200 having one side that faces the flow path U and capable of moving relative to the flow path U. More specifically, the partition member 200 can be configured to selectively open or close the flow path U.

In some implementations, the fluid discharge valve 10 can further include a plunger 600 fixed to one side of the partition member 200 and provided movably, a coil 700 generating a magnetic field as electric current flows therethrough, and a core 800 provided on one side of the plunger 600 and transmitting the magnetic field formed by the coil 700 to the plunger 600. The plunger 600, the coil 700, and the core 800 can be components of a solenoid valve.

The fluid discharge valve 10 can reduce or help prevent the occurrence of a freezing phenomenon in the flow path U by supplying heat to the flow path U.

For example, the fluid discharge valve 10 can further include a heater 300 coupled and fixed to the housing 100 and having one side that supplies heat to the flow path U. The heat emitted from the heater 300 can be supplied to the flow path U, and accordingly, it can be possible to help to prevent the freezing phenomenon from occurring in the flow path U. In addition, the heater 300 can also supply heat to the partition member 200 described above. Thus, it can be possible to help to prevent the freezing phenomenon from occurring on the surface of the partition member 200. In one example, the heater 300 can be a positive temperature coefficient thermistor (PTC).

Continuing to refer to FIG. 1, the flow path U formed in the fluid discharge valve 10 can have a bent shape. More specifically, the flow path U can include a first flow path U1 communicating with the outside and extending along a first direction D1, and a second flow path U2 extending from the first flow path U1 along a second direction D2 that crosses the first direction D1.

In some examples, the heater 300 described above can be configured to provide heat to both the first flow path U1 and the second flow path U2. More specifically, one side of the heater 300 can face the first flow path U1, and the other side thereof can face the second flow path U2. In FIG. 1, the heater 300 can face an intersection where the first flow path U1 and the second flow path U2 meet each other. However, the fact that the heater 300 faces the first flow path U1 and the second flow path U2 does not mean that the heater 300 is directly exposed to the first flow path U1 and the second flow path U2.

In some implementations, a portion of the housing 100 can be located in a space between the heater 300 and the first flow path U1 and a space between the heater 300 and the second flow path U2. However, a distance between the heater 300 and the first flow path U1 and a distance between the heater 300 and the second flow path U2 should be close enough to allow thermal energy emitted from the heater 300 to be sufficiently transferred to the first flow path U1 and the second flow path U2 by heat conduction.

As described above, the partition member 200 can be configured to selectively open or close the flow path U. More specifically, the partition member 200 can be movably provided to open or close the intersection where the first flow path U1 and the second flow path U2 meet each other. In some examples, the partition member 200 can move in a direction parallel to the first direction D1, that is, a direction in which the first flow path U1 extends.

In the fluid discharge valve 10, the fluid can flow into the fluid discharge valve 10 via the first flow path U1 and then discharged to the outside via the second flow path U2. Accordingly, when the partition member 200 moves in parallel to the first direction D1, a region in contact with the fluid in the partition member 200 is limited to one side surface (the left side surface of the partition member 200 with reference to FIG. 1). Therefore, an area, in which the partition member 200 comes into contact with the fluid that flows through the flow path U, can be significantly reduced, compared to the case in which the partition member 200 moves in a direction parallel to the second direction D2. That is, freezing occurring in the partition member 200 due to the fluid within the flow path U can be significantly reduced, and thus the operation performance of the fluid discharge valve 10 can be enhanced in a low temperature state.

In some implementations, referring to FIG. 1, the heater 300 can surround the entire circumference of the inner surface of the housing 100 that defines the first flow path U1. This can be understood as that the heater 300 has a ring shape when the first flow path U1 and peripheral components thereof are cut in a direction perpendicular to the first direction D1 with reference to FIG. 1. Here, the fact that the heater 300 has the ring shape should be interpreted as including a case in which the heater 300 has a quadrangular cross-sectional shape as well as a case in which the heater 300 has a circular cross-sectional shape. That is, the ring shape can include a circular shape or a polygonal shape that define a closed perimeter of the heater 300.

Figure 4:
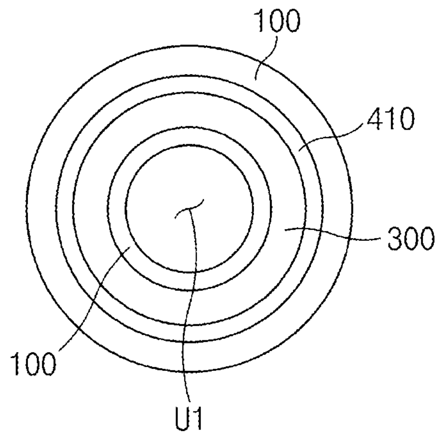
FIG. 4 is a cross-sectional view illustrating an example of a first electrode region and a heater in FIG. 1, where the heater has a circular ring shape.
Figure 5:
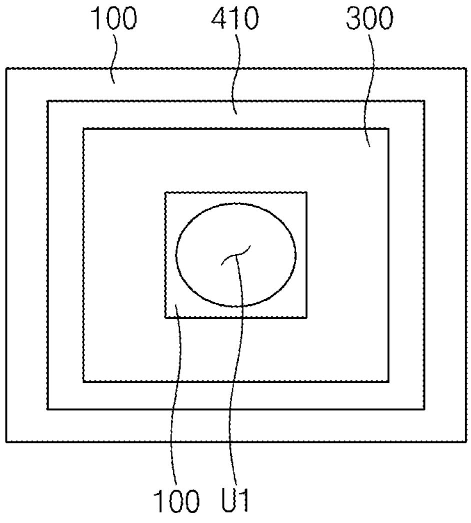
FIG. 5 is a cross-sectional view illustrating an example of a first electrode region and a heater in FIG. 1, where the heater has a quadrangular ring shape.

FIG. 4 is a cross-sectional view illustrating an example of a first electrode region and the heater in FIG. 1 are vertically cut, where the heater has a circular ring shape. FIG. 5 is a cross-sectional view illustrating an example of a first electrode region and the heater in FIG. 1, where the heater has a quadrangular ring shape. FIG. 4 illustrates the case where the heater 300 has a circular ring shape, and FIG. 5 illustrates the case where the heater 300 has a quadrangular ring shape.

As described above, in some implementations, the heater 300 can include a PTC. Therefore, based on electric current being supplied to the heater 300, the heater 300 can be configured to dissipate heat. In some examples, the fluid discharge valve 10 can further include an electrode member 400 which is inserted into the housing 100 and comes into close contact with the heater 300. The electrode member 400 can be configured to receive electric current from the outside and transmit the electric current to the heater 300. Thus, the electrode member 400 can include a conductive material.

In some implementations, the electrode member 400 can serve to supply electric current to the heater 300, and can also serve to transmit heat to the flow path U through heat conduction after receiving the heat emitted from the heater 300. This can be because a material having high electrical conductivity generally has high thermal conductivity. In one example, the electrode member 400 can be made of metal or made of an alloy including metal.

More specifically, as illustrated in FIG. 1, the electrode member 400 can include a first electrode region 410 which faces the first flow path U1 with the heater 300 therebetween, and a second electrode region 420 which surrounds an outer region of the second flow path U2. In some examples, the first electrode region 410 and the second electrode region 420 can be directly connected to each other. Thus, the electrode member 400 can have a bent shape in a region where the first electrode region 410 meets the second electrode region 420.

Continuing to refer to FIG. 1, the heat, which is generated by the heater 300 and transferred to the first flow path U1, can be transferred to the first flow path U1 via the housing 100 provided between the heater 300 and the first flow path U1. On the other hand, a portion of the heat, which is generated by the heater 300 and transferred the second flow path U2, can be transferred via the housing 100, and the other portion of the heat, which is generated by the heater 300 and transferred to the second flow path U2, can be transferred via the second electrode region 420.

In some implementations, the second electrode region 420 illustrated in FIG. 1 can surround the entire circumference of the inner surface of the housing 100 that defines the second flow path U2. This can be understood as that the second electrode region 420 has a ring shape when the second flow path U2 and peripheral components thereof are cut in a direction perpendicular to the second direction D2 with reference to FIG. 1. Here, the fact that the second electrode region 420 has the ring shape should be interpreted as including a case in which the second electrode region 420 has a quadrangular cross-sectional shape as well as a case in which the second electrode region 420 has a circular cross-sectional shape. That is, the ring shape can include a circular shape or a polygonal shape that define a closed perimeter of the electrode region 420.

In some implementations, the housing 100, the first electrode region 410, and the heater 300 can have ring shapes. For example, the housing 100, the first electrode region 410, and the heater 300 can have circular ring shapes as shown in FIG. 4. In some examples, the housing 100, the first electrode region 410, and the heater 300 can have a polygonal (e.g., quadrangular) ring shapes as shown in FIG. 5.

Continuing to refer to FIG. 1, the first direction D1, in which the first flow path U1 extends, can be parallel to the horizontal direction, and the second direction D2, in which the second flow path U2 extends, can be parallel to the vertical direction.

As described above, the fluid, which has flowed into the fluid discharge valve 10, can be discharged to the outside via the second flow path U2 after flowing into the first flow path U1. Here, when the second flow path U2 is formed parallel to the vertical direction, water present in the flow path U of the fluid discharge valve 10 can be rapidly discharged downward by gravity. Thus, freezing due to the water can be minimized.

In some implementations, the fluid discharge valve 10 can further include a fixing member 500 which couples and fixes the electrode member 400 to the housing 100.

In some implementations, as illustrated in FIG. 1, the fixing member 500 can include a plurality of wedges 510, each of which has one end coupled to the electrode member 400 and extends in a direction inclined with respect to the first direction D1 or the second direction D2. In this case, the wedge 510 can move relative to the housing 100 in a direction in which the electrode member 400 is inserted into the housing 100. However, in the opposite direction, the wedge 510 can be prevented from moving relative to the housing 100. Thus, the electrode member 400 can be fixed to the inside of the housing 100 by the plurality of wedges 510.

In some implementations, referring to FIG. 2, the fixing member 500 can include a flat spring 520 which has one side fixed to the electrode member 400. Similar to the wedge 510 described above, the flat spring 520 can also be movable in the direction in which the electrode member 400 is inserted into the housing 100, but can be prevented from moving in the opposite direction. Thus, the electrode member 400 can be fixed to the inside of the housing 100 by the flat spring 520.

In some implementations, referring to FIG. 3, a fixing member 500 can include a protrusion 530 which has one end coupled to the electrode member 400 and the other end coupled to the housing 100. Here, a direction, in which the one end on the electrode member 400 extends to the other end, can be perpendicular to a direction, in which the electrode member 400 extends.

The occurrence of freezing issues is minimized even when the solenoid valve is exposed to low temperatures, and thus the operation performance of the solenoid valve can be secured even in a low temperature state.

Although the present disclosure has been described with specific exemplary implementations and drawings, the present disclosure is not limited thereto, and it is obvious that various changes and modifications can be made by a person skilled in the art to which the present disclosure pertains within the technical idea of the present disclosure and equivalent scope of the appended claims.

What is claimed is:

1. A fluid discharge valve comprising:
- a housing that defines a flow path configured to guide fluid;
- a partition that faces the flow path and is configured to move relative to the flow path; and
- a heater coupled and fixed to the housing, the heater being configured to supply heat to the flow path,
- wherein the flow path comprises:
  - a first flow path that is in fluid communication with an outside of the housing and extends along a first direction toward the partition, the first flow path being configured to introduce the fluid into the housing, and
  - a second flow path that extends from the first flow path along a second direction different from the first direction, the second flow path being configured to discharge the fluid to the outside of the housing,
- wherein the heater has a first side that faces the first flow path and a second side that faces the second flow path, the heater being configured to provide heat to both of the first flow path and the second flow path, and
- wherein the partition is configured to move in a direction parallel to the first direction.

2. The fluid discharge valve of claim 1, wherein the housing has an inner surface that defines the first flow path, and wherein the heater surrounds an entire circumference of the inner surface of the housing.

3. The fluid discharge valve of claim 1, further comprising an electrode that is inserted into the housing and contacts the heater.

4. The fluid discharge valve of claim 3, wherein the electrode comprises a first electrode that faces the first flow path, and wherein the heater is disposed between the electrode and the first flow path.

5. The fluid discharge valve of claim 4, wherein the electrode further comprises a second electrode that surrounds the second flow path.

6. The fluid discharge valve of claim 5, wherein the first electrode and the second electrode are directly connected to each other.

7. The fluid discharge valve of claim 5, wherein the housing has an inner surface that defines the second flow path, and wherein the second electrode surrounds an entire circumference of the inner surface of the housing.

8. The fluid discharge valve of claim 3, further comprising a fixing member that couples and fixes the electrode to the housing.

9. The fluid discharge valve of claim 8, wherein the fixing member comprises a plurality of wedges that are inclined with respect to the first direction or the second direction, each of the plurality of wedges having an end coupled to the electrode.

10. The fluid discharge valve of claim 8, wherein the fixing member comprises a flat spring that has one side fixed to the electrode.

11. The fluid discharge valve of claim 8, wherein the fixing member comprises a protrusion that has a first end coupled to the electrode and a second end coupled to the housing, the protrusion extending from the first end to the second end in a direction perpendicular to an extension direction of the electrode.

12. The fluid discharge valve of claim 1, wherein the first direction is parallel to a horizontal direction, and the second direction is parallel to a vertical direction orthogonal to the horizontal direction.

13. A fluid discharge valve comprising:

a housing that defines a flow path configured to guide fluid;

a partition that faces the flow path and is configured to move relative to the flow path; and a heater coupled and fixed to the housing, the heater being configured to supply heat to the flow path, wherein the flow path comprises:

a first flow path that is in fluid communication with an outside of the housing and extends along a first direction toward the partition, the first flow path being configured to introduce the fluid into the housing, and a second flow path that extends from the first flow path along a second direction different from the first direction, the second flow path being configured to discharge the fluid to the outside of the housing, wherein the heater has a first side that faces the first flow path and a second side that faces the second flow path, the heater being configured to provide heat to both the first flow path and the second flow path, wherein the housing and the heater have circular ring shapes, and wherein the heater is disposed inside the housing and surrounds the first flow path.

14. The fluid discharge valve of claim 13, further comprising an electrode that is inserted between the housing and the heater and surrounds the heater, the electrode having a circular ring shape.

15. The fluid discharge valve of claim 14, wherein the electrode is in contact with an outer circumferential surface of the heater and an inner circumferential surface of the housing.

16. A fluid discharge valve comprising:

a housing that defines a flow path configured to guide fluid;

a partition that faces the flow path and is configured to move relative to the flow path; and a heater coupled and fixed to the housing, the heater being configured to supply heat to the flow path, wherein the flow path comprises:

a first flow path that is in fluid communication with an outside of the housing and extends along a first direction toward the partition, the first flow path being configured to introduce the fluid into the housing, and a second flow path that extends from the first flow path along a second direction different from the first direction, the second flow path being configured to discharge the fluid to the outside of the housing, wherein the heater has a first side that faces the first flow path and a second side that faces the second flow path, the heater being configured to provide heat to both the first flow path and the second flow path, wherein the housing and the heater have quadrangular ring shapes, and wherein the heater is disposed inside the housing and surrounds the first flow path.

17. The fluid discharge valve of claim 16, further comprising an electrode that is inserted between the housing and the heater and surrounds the heater, the electrode having a quadrangular ring shape.

18. The fluid discharge valve of claim 17, wherein the housing has a plurality of housing surfaces that face and surround the electrode, wherein the electrode has a plurality of electrode surfaces that face the plurality of housing surfaces and surround the heater, and wherein the heater has a plurality of heater surfaces that face the plurality of electrode surfaces and surround the first flow path.

* * * * *